Figure 1:
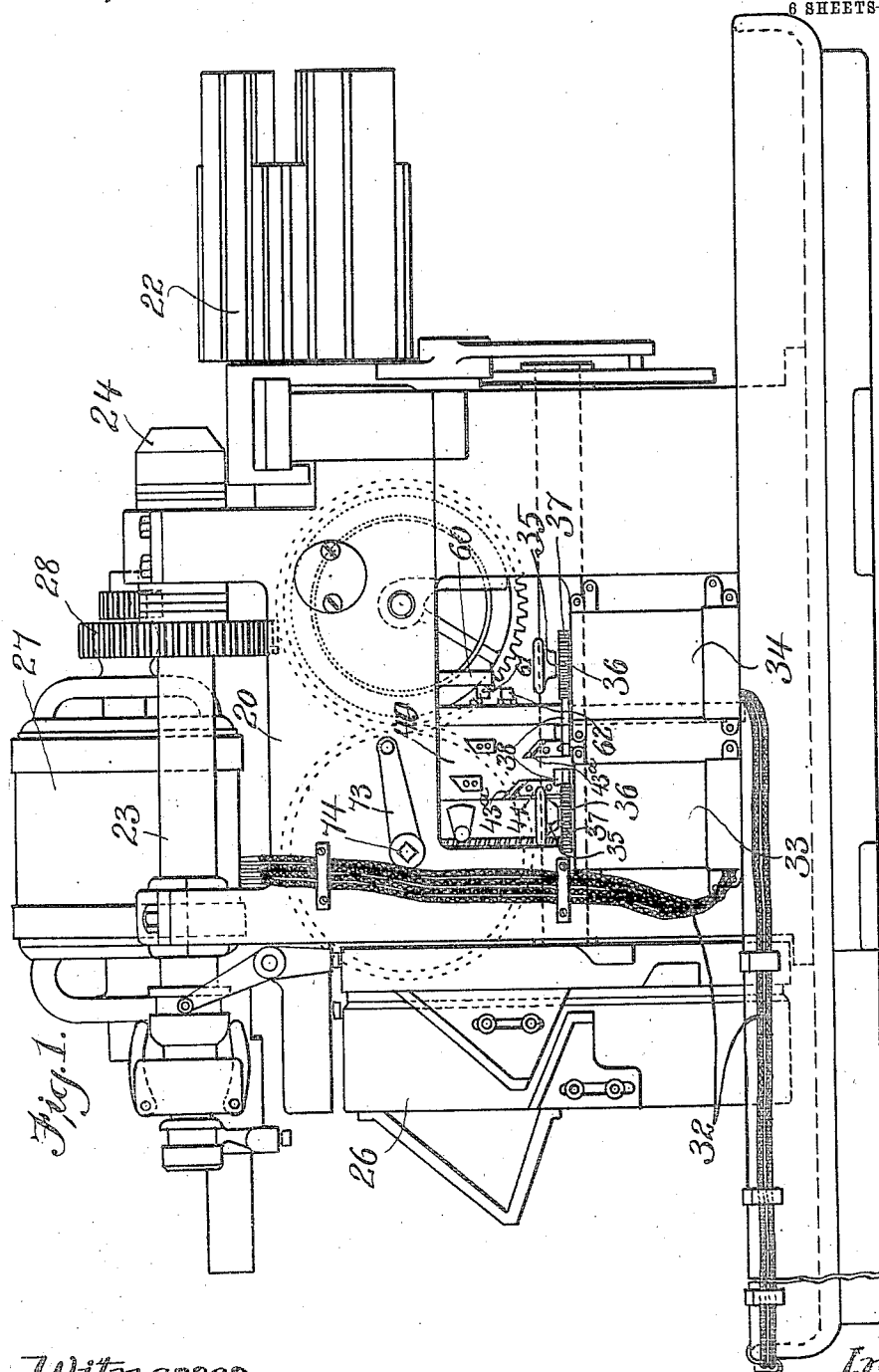

G. O. GRIDLEY.
LATHE.
APPLICATION FILED NOV. 24, 1905.
971,370.
Patented Sept. 27, 1910.
6 SHEETS—SHEET 2.
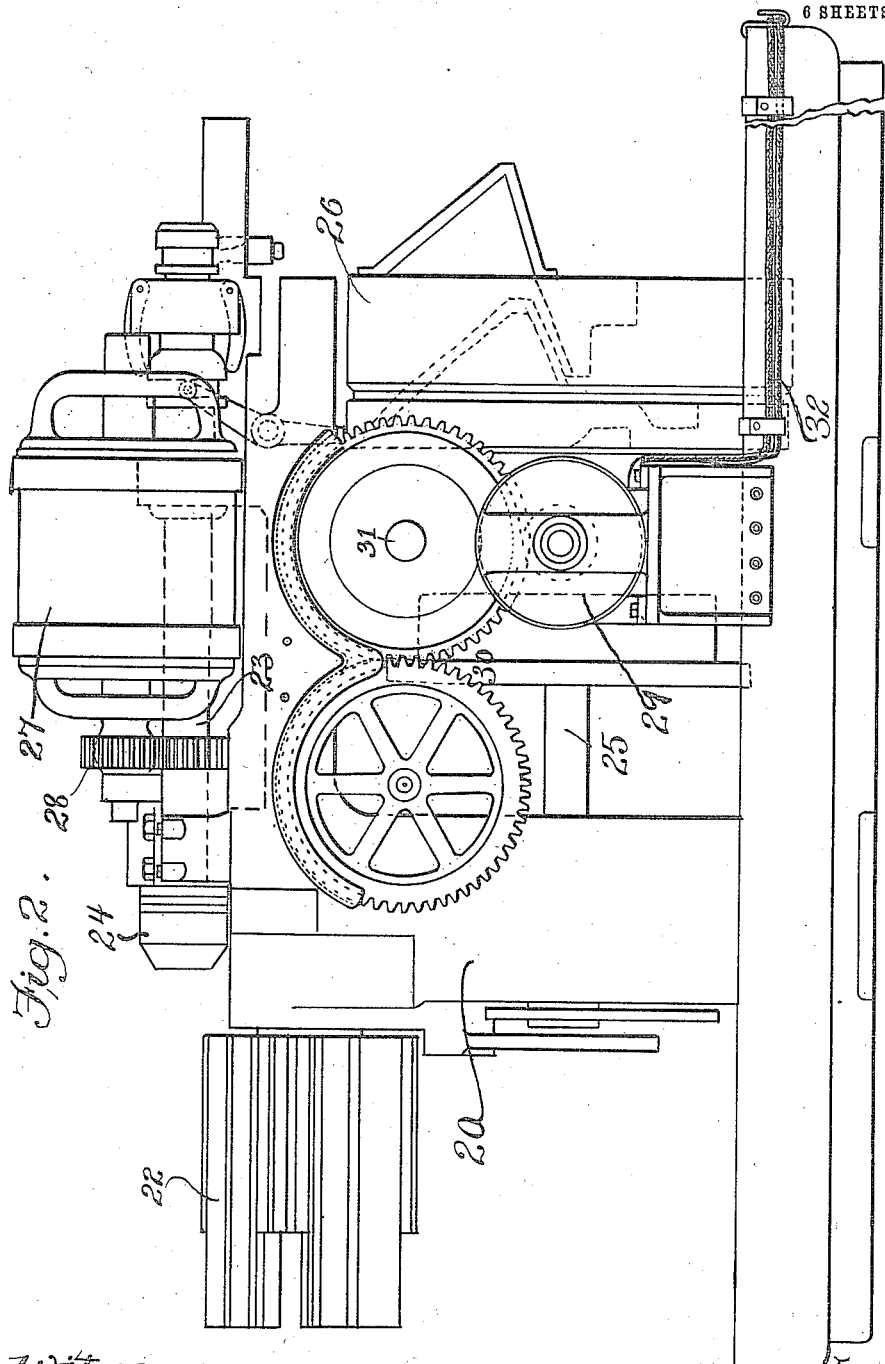
Witnesses:
C. C. Stecher.
L. E. Kennedy.
Inventor
George O. Gridley
by Wright, Brown, Quinby & May
Attys.

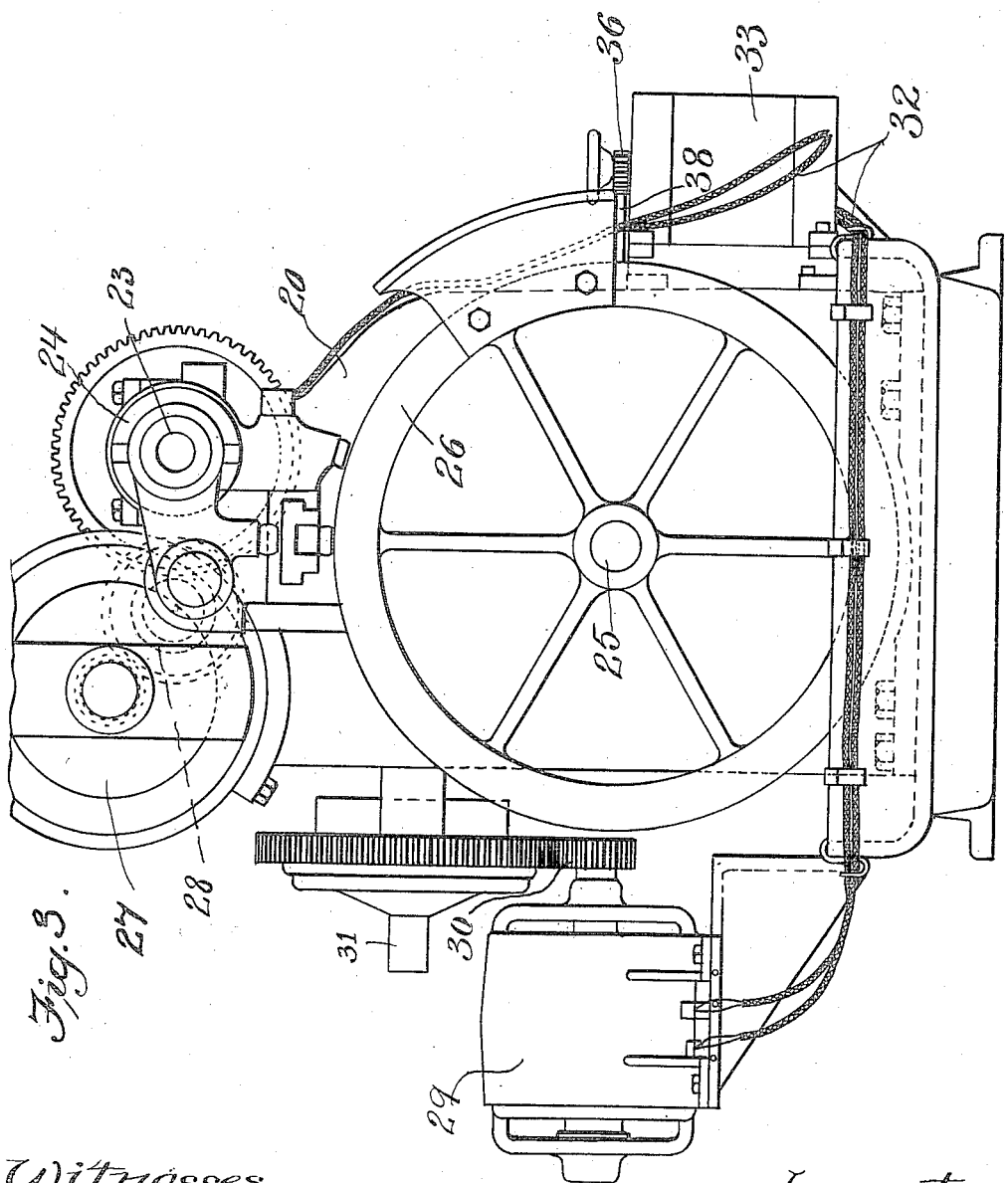

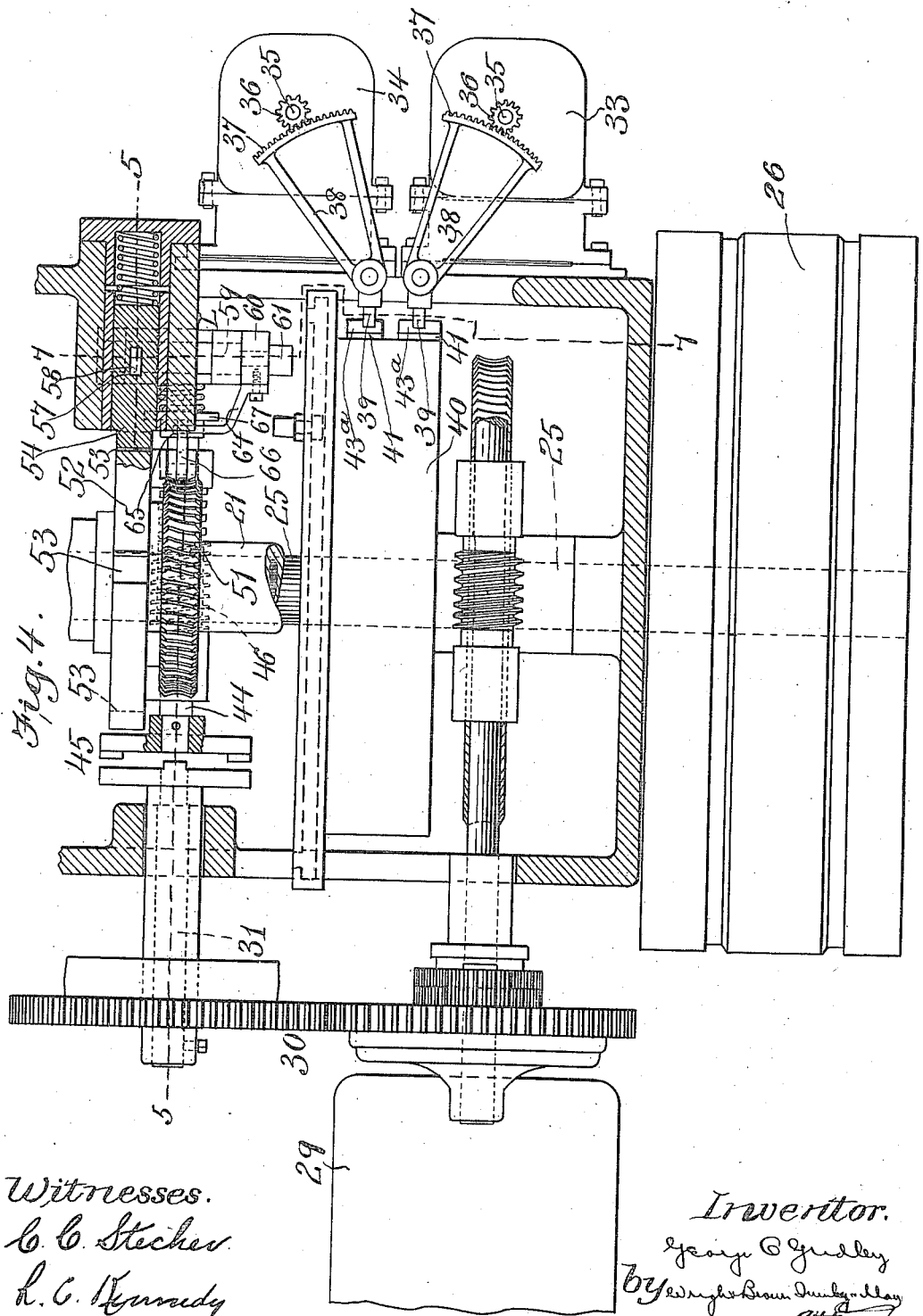

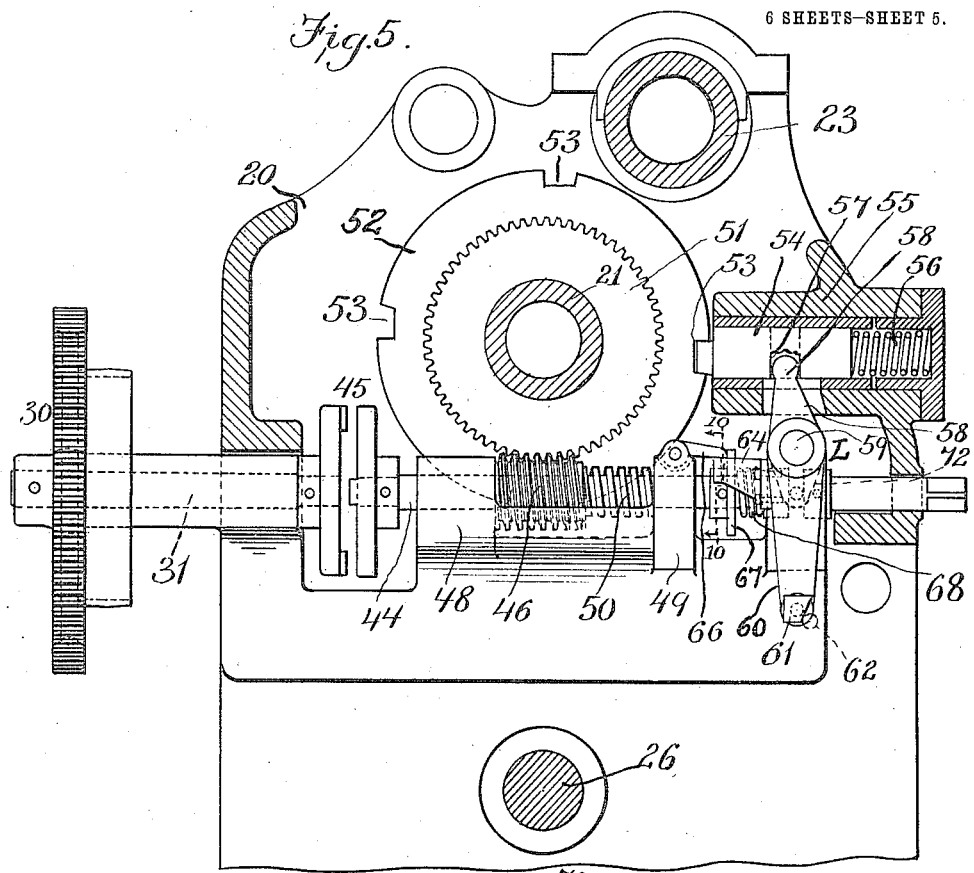
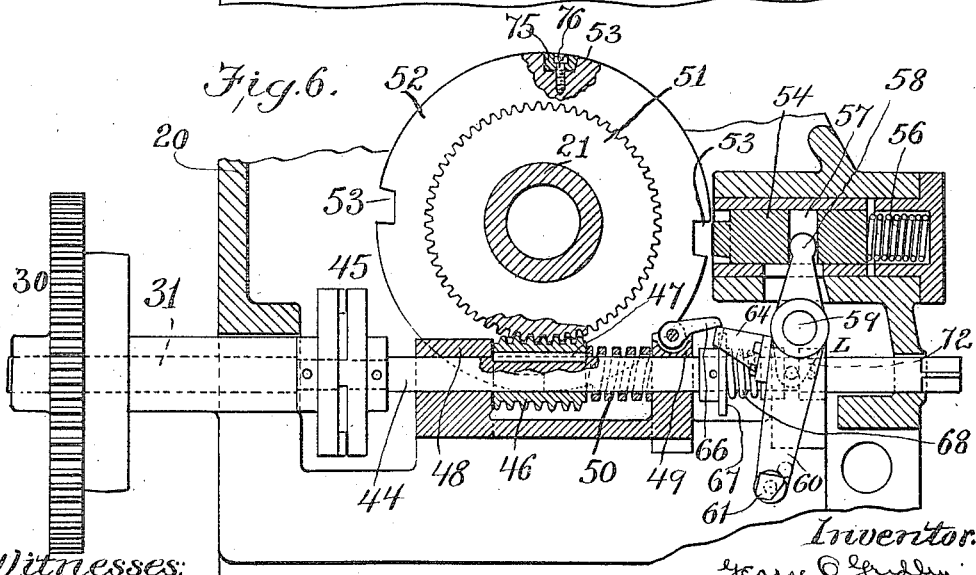

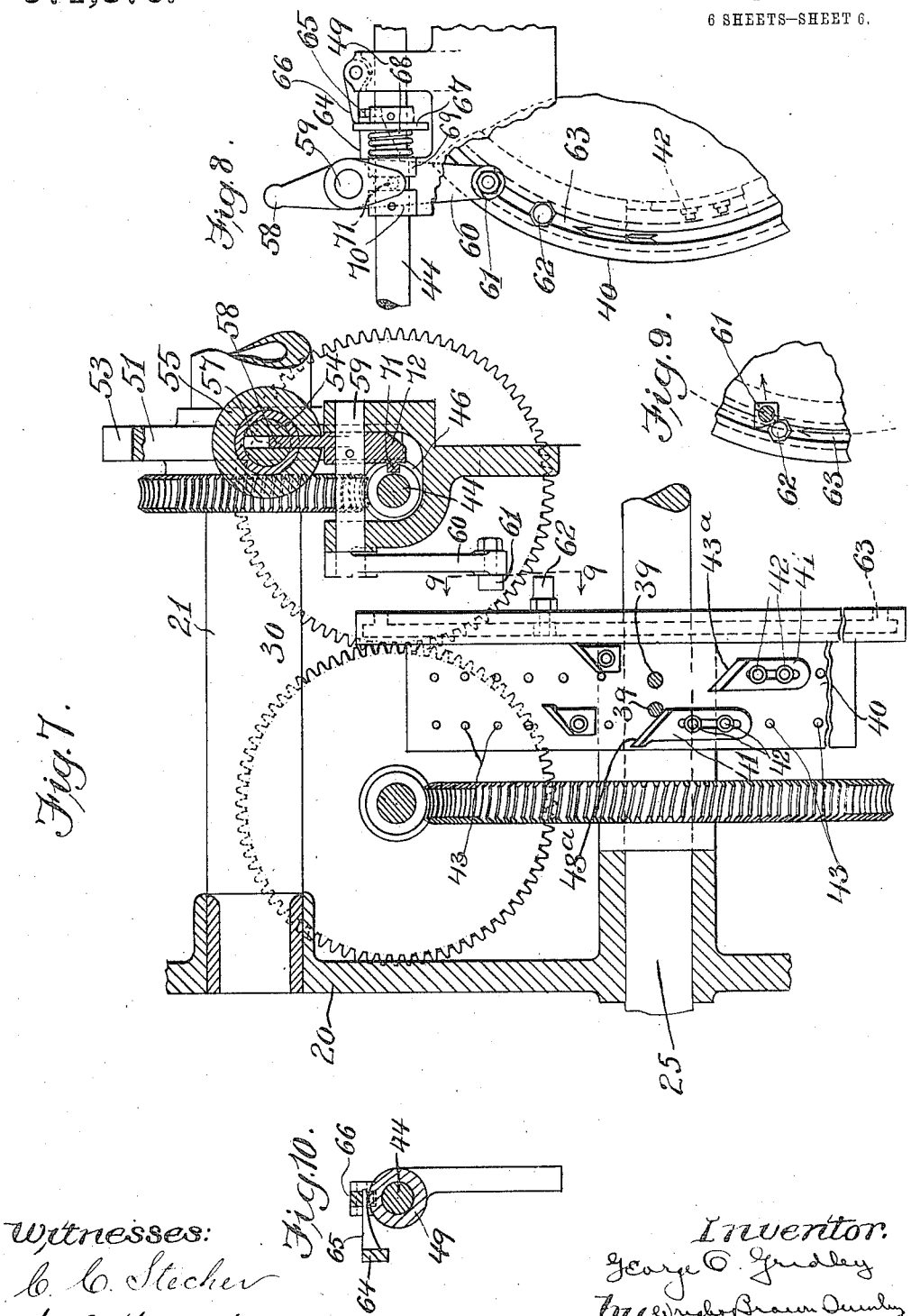

UNITED STATES PATENT OFFICE.

GEORGE O. GRIDLEY, OF WINDSOR, VERMONT.

LATHE.

971,370.  Specification of Letters Patent.  Patented Sept. 27, 1910.

Application filed November 24, 1905. Serial No. 288,844.

*To all whom it may concern:*

Be it known that I, GEORGE O. GRIDLEY, of Windsor, in the county of Windsor and State of Vermont, have invented certain new and useful Improvements in Lathes, of which the following is a specification.

This invention relates to machine tools, and more particularly to lathes of the turret type, such as are described in my Patent No. 725,438, dated April 14, 1903. Its principal objects are to provide efficient driving and turret-revolving means.

In the accompanying drawings, in which similar characters designate like parts throughout the several views,—Figure 1 is a side elevation of one embodiment of my invention; Fig. 2 is a similar view of the opposite side of the machine; Fig. 3 is an end elevation looking from the left in Fig. 1; Fig. 4 is a horizontal section taken in the general plane of the actuating-shaft for the turret-revolving mechanism; Figs. 5 and 6 are vertical sectional details on the line 5—5 of Fig. 4; Fig. 7 is a similar view on the line 7—7 of Fig. 4; Fig. 8 is a detail view in side elevation of a portion of the cam-drum and more closely associated parts; Fig. 9 is a sectional detail view on the line 9—9 of Fig. 7; and Fig. 10 is a similar view on the line 10—10 of Fig. 5.

The numeral 20 designates a frame, having journaled near its upper portion a shaft 21, upon which is mounted the turret 22. The turret is provided with a plurality of tool slides which are independently movable in lines parallel to the axis of rotation of the turret, as illustrated and described in my patent hereinbefore referred to. Above this turret-shaft is journaled a work-shaft or spindle 23, carrying a chuck 24. In the lower part of the frame is rotatably mounted a feed-controlling shaft 25, having at its outer extremity, beneath the spindle, a cam-drum 26 which serves to control the movement of the tool slides upon the turret and also to actuate the chuck. This forms no part of the present invention and need not be particularly described.

Carried in brackets at the top of the frame is a motor 27, here shown as of the electric type, the shaft of which is connected by suitable gearing 28 to the work-shaft. At one side of the frame, brackets extend therefrom carrying a motor 29, also preferably of the electric type, which is connected by gearing 30 with a shaft 31 extending across the frame at right angles with the shaft 25 and which controls the rotation of the turret.

Connected with the circuits of the motors 27 and 29 by conductors 32 are rheostats or controlling devices 33 and 34, respectively, these enabling the speeds of the motors to be varied as desired. Each rheostat has the usual adjusting spindle 35, which has at its upper end a pinion 36. With each pinion meshes a toothed segment 37, which may be conveniently formed integrally with a lever 38 pivotally mounted upon the frame. At the opposite extremity of each lever from the segment is a reduced portion or arm 39.

The shaft 25 has fixed upon it a drum or rotatable member 40, from the periphery of which project members 41, here shown as secured in place by bolts 42, extending into recesses or threaded openings 43. The position of the members 41 about the drum may be varied by securing them to one or another of these openings. Each of these members has at one side a cam-face 43$^a$, which is adapted to contact with one of the lever-arms 39 to move it, and thus rotate the corresponding rheostat spindle through the segment and pinion. In this way the speed of the motors is varied automatically by the machine, and the time of variation of either may be adjusted as desired independently of the other. By this means one may, for example, in starting the tools at the end of a long piece of work, obtain a fine feed, so that the springing away is prevented. Then when the back rest comes into coaction with the work, holding it against displacement, the speed may be increased to all that the tools will stand; or while taking a heavy roughing cut a slow spindle speed and a fine feed may be used, and for finishing the speed of both the spindle and the tools can be simultaneously increased.

The turret-actuating shaft 31 has an independently-rotatable section 44 connected to that driven by the gearing through a clutch 45, preferably of the jaw type. This shaft section 44 carries a worm 46, joined to the shaft by a spline or groove 47, compelling its rotation with the shaft while permitting it to move longitudinally thereof between brackets 48 and 49. The worm is normally held against the bracket 48 by a spring 50, which at its opposite end contacts with the bracket 49, or some other relatively fixed point. Meshing with the worm is a worm-wheel 51, fast upon the turret-shaft. This shaft also has fixed to it, adjacent to the worm-wheel, a locking disk or member 52, in the periphery of which are depressions 53, which in the present instance are four in number. Coöperating with these depressions is a locking member 54, movably mounted in a housing or chamber 55 formed in the frame. A spring 56 situated between the inner end of the locking member and the housing forces the former toward the locking disk. The locking member is provided with a recess 57 into which, through an opening in the lower portion of the housing, projects one arm 58 of a lever mechanism L, fulcrumed upon a shaft 59 rotatably mounted in the frame. From the opposite end of the shaft depends an arm 60 having a projection 61 lying in the path of a pin or contact member 62, movably secured in a T-slot 63 near the edge of one end of the drum 40. The lever L has a third arm 64, from which a projection 65 extends below a latch or retaining member 66, pivoted upon the bracket 49. The latch is normally held by gravity in the path of a coöperating retaining member 67, preferably in the form of a disk fixed to the shaft section 44, these members, when in contact, holding said shaft section against movement, so that the engagement of the clutch is prevented. Against the opposite side of the retaining disk from the latch rests a spring 68, having contacting with its opposite extremity a loose collar 69. Between this collar 69 and a collar 70 fixed to the shaft extends a pin or projection 71 from a depending arm 72 of the lever mechanism.

Considering the locking member to occupy one of the depressions in the locking disk, the elements of the turret-controlling mechanism will have the relation illustrated in Fig. 5 of the drawings, the clutch members being held out of coöperation by the action of the spring 56. This holds the turret in the proper position for one of the tools to act upon the work. This tool having finished its operation and it being desired to bring its successor into action, the pin 62 of the controlling-drum strikes the arm 60 of the lever mechanism. This causes the upper arm of said mechanism to retract the locking member from the disk depression, thus releasing the turret-shaft. At the same time the arm 64 raises the latch 66 from coaction with the retaining-disk, leaving the actuating-shaft 44 free to move longitudinally. While this is occurring the arm 72 is compressing the spring 68 and permitting the retaining members to remain in engagement until the locking-mechanism has been released. When the latch rises clear of the retaining-disk the compressed spring shifts the shaft, resulting in the coöperation of the clutch members, causing the turret-shaft to be rotated by the worm-gearing (see Fig. 6). During this time the locking member rides over the surface of the locking disk until it reaches the next depression, which it enters, urged by the spring 56. This, through the lever mechanism, separates the clutch members and allows the latch to fall behind the rotating disk, thus restoring the elements to their original positions. It will be seen that when the turret-shaft is thus locked, the rotation of the turret-actuating shaft would tend to continue by virtue of the momentum of the parts, thus causing a considerable strain to be brought upon the teeth of the worm-gearing, which are liable to be broken thereby. The presence of the spring 50, however, prevents this, the worm yielding bodily before the rotation of the worm-wheel, the latter acting as a nut and turning the worm as a screw, causing the shock to be cushioned, and thus checking the rotation of the worm and overcoming the momemtum thereof and of the driven section of the actuator shaft.

If one wishes to operate the controlling-shaft manually, this may be effected by a crank 73 applied to its squared end 74.

It may be desired to prevent the operation of one or more of the tools upon the turret. In this case a block 75 may be secured by a screw 76 in the depression of the disk which determines the locking of the turret for this particular tool. This causes the locking member to ride over the depression without entering it, thus throwing the tool out of action.

I claim:—

1. A machine tool comprising a work shaft, a feed-controlling shaft, independent sources of power for said shafts, means for varying the speed of the work shaft, and means on said feed-controlling shaft for controlling said speed-varying means, whereby any predetermined relations of the speeds of the feed-controlling shaft and the work-shaft may be secured.

2. A machine tool comprising a tool carrier, a work shaft, a feed-controlling shaft for effecting the feed of the tool carrier, mechanism for driving said feed-controlling shaft at different speeds to feed said tool carrier forward at any one of several speeds while the cutter is at work, independent mechanism for driving said work shaft at different speeds, and independent means mounted on said feed-controlling shaft for varying the speed of rotation of said driving mechanisms.

3. A machine tool comprising a work shaft, a tool carrier, a feed-controlling shaft for the tool carrier, independent motors for operating said shafts, means for varying the driving speed of each motor, and independent means mounted on said feed-controlling shaft for controlling the said speed-varying means.

4. A machine tool, comprising a work shaft, a feed-controlling shaft, an independent motor for operating each shaft, and independent means for varying the driving speed of said motors, each of said means including a spindle, a gear on each spindle, a gear segment meshing with the gear, a cam driver on the feed-controlling shaft, and cams thereon for actuating the segment.

5. A machine tool comprising a turret-rotating shaft, an actuating shaft therefor, having independently rotatable sections one of which is longitudinally movable, clutch members on said sections for connecting the sections when one is moved toward the other, a spring exerting tension to move the shaft axially, means coöperating with one of the shaft sections for temporarily maintaining the clutch disconnected against the tension of the spring, and mechanism for increasing the tension of the spring intermittently to cause the engagement of the clutch members, substantially for the purpose set forth.

6. A machine tool comprising a turret-rotating shaft, an actuating shaft therefor having independently rotatable sections one of which is longitudinally movable, complemental clutch members on said sections, a member fixed to the movable section, lever mechanism coöperating with one side of said member to place the said sections in clutched relation, and a latch coöperating with the other side of said member to maintain the clutch members disconnected.

7. A machine tool comprising a turret-rotating shaft, an actuating shaft therefor having independently rotatable sections one of which is longitudinally movable, complemental clutch members on said sections, a member fixed on the movable section, a spring contacting with one side of the member, lever mechanism coöperating with the spring to move said movable section into clutched relation to the other section, and a latch movable into engagement with the side of the member opposite the spring to hold said sections out of clutched relation.

8. A machine tool comprising a turret shaft, an actuating shaft therefor having independently rotatable sections, one of which is driven and one of which is longitudinally movable, complemental clutch members on said sections of which one is adapted to move endwise into engagement with the other, a latch coöperating with the movable shaft section to hold said clutch members out of clutched relation, and lever mechanism for moving the shaft and having a portion for shifting the latch.

9. A machine tool comprising a turret shaft, an actuating shaft therefor, a clutch having members of which one is movable axially with relation to the other associated with the actuating shaft, locking means for the turret shaft, a latch for holding the clutch members apart, and lever mechanism for controlling the clutch and having portions coöperating with the locking means and the latch and operable by the machine for moving the lever mechanism.

10. A machine tool comprising a turret shaft, an actuating shaft therefor, a clutch associated with said shaft, a spring for closing the clutch, a latch for holding the clutch open, locking means for the turret shaft, lever mechanism coöperating with the clutch and locking means, and a yieldable connection between the lever mechanism and the clutch whereby the clutch is operated yieldingly by the power of said spring.

11. A machine tool comprising a turret-shaft, an actuating shaft therefor, a clutch associated with the actuating shaft, locking means for the turret shaft, a latch for retaining the clutch against movement until after the movement of the locking means, and lever mechanism coöperating with the actuating shaft, locking means and retaining latch to release the locking means, trip the latch, and close the clutch.

12. A machine tool comprising a turret shaft, a locking disk provided with depressions and being carried by the turret shaft, an actuating shaft for the turret shaft having independently-rotatable sections, a clutch for connecting the sections, a locking member for engagement with the locking-disk depressions, lever mechanism for moving the locking member and closing the clutch, and power-driven mechanism for operating said lever mechanism.

13. A machine tool comprising a turret shaft, a locking disk provided with depressions and being carried by the turret shaft, an actuating shaft for the turret shaft having independently-rotatable sections of which one is movable toward and from the other, clutch members on the sections, a locking member for engagement with the locking-disk depressions, a lever mechanism for moving the locking member and the movable shaft section to withdraw the locking member and move said movable section to engage said clutch members, and a spring which constantly tends to force the locking member toward the disk.

14. A machine tool comprising a turret shaft, a locking disk provided with depressions and being carried by the turret shaft, an actuating shaft for the turret shaft having independently-rotatable sections, a spring for moving one of said sections toward the other, a clutch for connecting the sections, a locking member for engagement with the locking-disk depressions, a retaining member carried by the movable member of the actuating shaft, a latch pivoted on a relatively fixed portion of the machine and adapted to engage said retaining member and thus resist the pressure of the spring, and lever mechanism coöperating with the locking member, a shaft section and the latch.

15. A machine tool comprising a turret shaft, a locking disk provided with depressions and being carried by the turret shaft, an actuating shaft for the turret shaft having independently-rotatable sections, a clutch for connecting the sections, a locking member for engagement with the locking disk depressions, a disk fixed to the actuating shaft, a latch coöperating with the disk, and means for moving the locking member, a shaft section and the latch.

16. A machine tool comprising a turret, a disk rotatable with the turret and having depressions, a locking member automatically coöperating with the depressions, and a device detachably secured to said disk to prevent the locking member from entering one of the depressions.

17. A machine tool comprising a turret for the reception of a normal number of tools, a disk rotatable with the turret and having depressions equal to the normal number of tools, a spring-pressed locking member coöperating with the depressions, a block detachably secured in one of the depressions when the number of tools on the turret is less than the normal.

18. A machine tool comprising a work shaft, a multiple tool holder, a feed-controller shaft, connections from the latter to the tool holder adapted to feed the tool holder a plurality of times during one rotation of the shaft, speed-varying means for each shaft, and means mounted on said feed-controlling shaft adapted to actuate each speed-varying means.

In testimony whereof I have affixed my signature, in presence of two witnesses.

GEORGE O. GRIDLEY.

Witnesses:
F. L. CONE,
E. A. FAIRMAN.